United States Patent [19]

Fowler

[11] Patent Number: 5,111,027
[45] Date of Patent: May 5, 1992

[54] CONTROL SYSTEM AND METHODS OF MAKING AND OPERATING THE SAME

[75] Inventor: Daniel L. Fowler, Kentwood, Mich.

[73] Assignee: Robertshaw Controls Company, Richmond, Va.

[21] Appl. No.: 616,224

[22] Filed: Nov. 20, 1990

Related U.S. Application Data

[62] Division of Ser. No. 376,388, Jul. 6, 1989, Pat. No. 5,029,244.

[51] Int. Cl.⁵ .............................................. H05B 1/02
[52] U.S. Cl. .................................. 219/506; 219/497; 219/492; 219/501
[58] Field of Search ............... 219/506, 505, 497, 494, 219/491, 501, 492

[56] References Cited

U.S. PATENT DOCUMENTS

| | | | |
|---|---|---|---|
| 4,317,018 | 2/1982 | Deny | 219/508 |
| 4,782,215 | 11/1988 | Kadwell et al. | 219/494 |
| 4,814,583 | 3/1989 | Rainey | 219/496 |
| 4,829,161 | 5/1989 | Kadwell et al. | 219/508 |

Primary Examiner—Mark H. Paschall
Attorney, Agent, or Firm—Candor, Candor & Tassone

[57] ABSTRACT

A control system and methods of making and operating the control system are provided, the system comprising an RTD temperature sensor, an applying unit operatively interconnected to the sensor for applying a varying voltage across the sensor and thereby providing a certain current level through the sensor for each certain voltage value being applied across the sensor while the sensor is sensing a certain temperature, and a microcomputer operatively interconnected to the sensor and the applying unit for determining from the voltage being applied across the sensor the actual temperature being sensed by the sensor, the applying unit comprising a charge pump arrangement.

10 Claims, 9 Drawing Sheets

BROIL MODE TEMPERATURE ACTION POINTS

LOWER BAND:

UPPER BAND:

FORMATION OF ELEMENT RELAY T-ON AND T-OFF TEMPERTURES

LOWER BAND

UPPER BAND

BAKE MODE FIRST RISE COMPENSATION ACTION POINTS

CONTROL SYSTEM AND METHODS OF MAKING AND OPERATING THE SAME

CROSS REFERENCE TO RELATED APPLICATION

This application is a divisional patent application of its copending parent patent application Ser. No. 376,388 filed Jul. 6, 1989, now U.S. Pat. No. 5,029,244.

BACKGROUND OF THE INVENTION

1. Field of the Invention

This invention relates to a new control system and to new methods of operating and making the control system, the control system being particularly adapted to be utilized for controlling the operation of a cooking apparatus or the like.

2. Prior Art Statement

It is known to provide a temperature regulating control system comprising an RTD temperature sensor means, applying means operatively interconnected to the sensor means for applying a varying voltage across the sensor means and thereby providing a certain current level through the sensor means for each certain voltage value being applied across the sensor means while the sensor means is sensing a certain temperature, and microcomputer means operatively interconnected to the sensor means and the applying means for determining from the voltage being applied across the sensor means the actual temperature being sensed by the sensor means. For example, see the Kadwell et al, U.S. Pat. No. 4,782,215 and the Brian J. Kadwell et al, copending patent application Ser. No. 248,395, filed Sep. 23, 1988.

It is also known to provide a control system comprising a high energy control circuit means having an output relay driver transistor, manually operated means for initiating the operation of the high energy control circuit means, microcomputer means for operating the high energy control circuit means after the manually operated means has initiated the operation thereof, and supervisory circuit means for detecting dynamic failure of the microcomputer means and disabling the high energy control circuit means if the microcomputer means is not operating in a normal mode thereof, the supervisory circuit means having means requiring the manual operation of the manually operated means before permitting power to reach the high energy control circuit means whereby the high energy control circuit means is disabled unless the manual operation of the manually operated means has taken place and the microcomputer means is operating in the normal mode thereof, the supervisory circuit means having a supervisory transistor therein that is in series with the relay driver transistor and that must be switched on to enable the relay driver transistor, the supervisory circuit means having a capacitor therein for sustaining the on condition of the supervisory transistor, the manually operated means comprising momentary means for initially charging the capacitor and switching on the supervisory transistor when the manually operated means has been manually and momentarily operated to initiate the operation of the high energy control circuit means, the microcomputer means having means for continuing the charging of the capacitor only after the initial manual and momentary operation of the manually operated means has initially charged the capacitor and if the microcomputer means is operating in a normal mode thereof. For example, see the aforementioned Kadwell et al, U.S. Pat. No. 4,782,215 and the aforementioned Brian J. Kadwell et al, copending patent application Ser. No. 248,395, filed Sep. 23, 1988.

SUMMARY OF THE INVENTION

It is one feature of this invention to provide a control system having a unique means for applying a varying voltage across an RTD temperature sensing means for the purpose of determining the actual temperature being sensed by the sensor means.

In particular, it was found according to the teachings of this invention that the varying voltage being applied across the RTD temperature sensing means can comprise a charge pump means.

Thus, one embodiment of this invention provides a temperature regulating control system comprising an RTD temperature sensor means, applying means operatively interconnected to the sensor means for applying a varying voltage across the sensor means and thereby providing a certain current level through the sensor means for each certain voltage value being applied across the sensor means while the sensor means is sensing a certain temperature, and microcomputer means operatively interconnected to the sensor means and the applying means for determining from the voltage being applied across the sensor means the actual temperature being sensed by the sensor means, the applying means comprising a charge pump means.

It is another feature of this invention to provide a control system having a unique supervisory circuit means for monitoring the high energy control circuit means thereof.

In particular, it was found according to the teachings of this invention that the temperature sensing means of the control system can have means that permits the continuous charging of a sustaining capacitor for the supervisory transistor of the supervisory circuit means as long as the temperature sensing means is sensing an output temperature effect of the heating means that is below a predetermined high temperature limit for the system and that terminates the charging of the capacitor when the sensed temperature is above the predetermined high temperature limit.

Thus, another embodiment of this invention provides a control system comprising a high energy control circuit means having an output relay driver transistor, manually operated means for initiating the operation of the high energy control circuit means, microcomputer means for operating the high energy control circuit means after the manually operated means has initiated the operation thereof, and supervisory circuit means for detecting dynamic failure of the microcomputer means and disabling the high energy control circuit means if the microcomputer means is not operating in a normal mode thereof, the supervisory circuit means having means requiring the manual operation of the manually operated means before permitting power to reach the high energy control circuit means whereby the high energy control circuit means is disabled unless the manual operation of the manually operated means has taken place and the microcomputer means is operating in the normal mode thereof, the supervisory circuit means having a supervisory transistor therein that is in series with the relay driver transistor and that must be switched on to enable the relay driver transistor, the supervisory circuit means having a capacitor therein for sustaining the on condition of the supervisory transistor, the manually operated means comprising momentary means for initially charging the capacitor and switching on the supervisory transistor when the manually operated means has been manually and momentarily operated to initiate the operation of the high energy control circuit means, the microcomputer means having means for continuing the charging of the capacitor only after the initial manual and momentary operation of the manually operated means has initially charged the capacitor and if the microcomputer means is operating in a normal mode thereof, and temperature sensing means disposed intermediate the microcomputer means and the supervisory circuit means and having means that permits the continous charging of the capacitor only as long as the temperature sensing means is sensing an output temperature effect of the heating means that is below a predetermined high temperature limit for the system and that terminates the charging of the capacitor when the sensed temperature is above the predetermined high temperature limit.

Accordingly, it is an object of this invention to provide a new control system having one or more of the novel features of this invention as set forth above or hereinafter shown or described.

Another object of this invention is to provide a new method of making such a control system, the method of this invention having one or more of the novel features of this invention as set forth above or hereinafter shown or described.

Another object of this invention is to provide a new method of operating such a control system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIGS. 4A, 4B, 4C, 4D and 4E respectively illustrate parts of the entire electrical circuit means of the control system of this invention, FIGS. 4A-4E being adapted to be arranged in the manner illustrated in FIG. 3 to provide the entire circuit means for the control unit of FIG. 1.

DESCRIPTION OF THE PREFERRED EMBODIMENT

Figure 1:
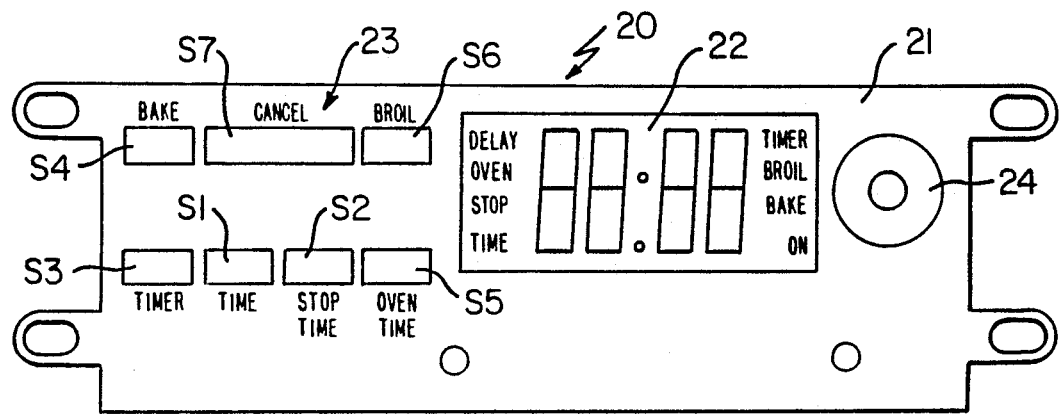
FIG. 1 is a schematic front view of a control unit of this invention that uses the control system of this invention that is illustrated in FIG. 2.

While the various features of this invention are hereinafter illustrated and described as being particularly adapted to provide a control system for controlling a domestic cooking oven or the like, it is to be understood that the various features of this invention can be utilized singly or in any combination thereof to provide a control system for controlling other apparatus or appliances as desired.

Therefore, this invention is not to be limited to only the embodiment illustrated in the drawings, because the drawings are merely utilized to illustrate one of the wide variety of uses of this invention.

Referring now to FIG. 1, the new control unit of this invention is generally indicated by the reference numeral 20 and comprises a frame means 21 having a visual display means 22, such as the well known vacuum fluorescent display means as set forth in the Fowler, U.S. Pat. No. 4,568,927, and a user interface means 23 that comprise a rotary switch 24, such as one of the rotary switches as set forth in the Fowler et al, U.S. Pat. No. 4,625,084, and seven momentary contact push buttons S1, S2, S3, S4, S5, S6 and S7 of conventional design that remain in a normally open condition when released and therefore must be held closed by the user in a manner well known in the art whereby the aforementioned two U.S. Pat. Nos. 4,568,927 and 4,625,084, are being incorporated into this disclosure by this reference thereto.

The control unit 20 is a solid state, microcomputer based device capable of providing several advanced functions for home use ovens. When used in conjunction with the appropriate temperature sensor, the control unit 20 provides the following main functions: Time-of-Day Clock; Minute Timer with Alarm; Control of Oven Temperature in Bake and Broil modes and Timed Bake Modes. Data entry is accomplished with the six function keys S1-S6 in conjunction with the rotary switch 24. The user selects a function with one of the keys S1-S6 and then enters data via the rotary switch 24, in the manner fully set forth in the aforementioned patents. Information is displayed to the user by means of the vacuum fluorescent display 22. Time and oven temperature information is displayed simultaneously. The display 22 is color coded for ease of identification with time and temperature information being blue-green.

Figure 2:
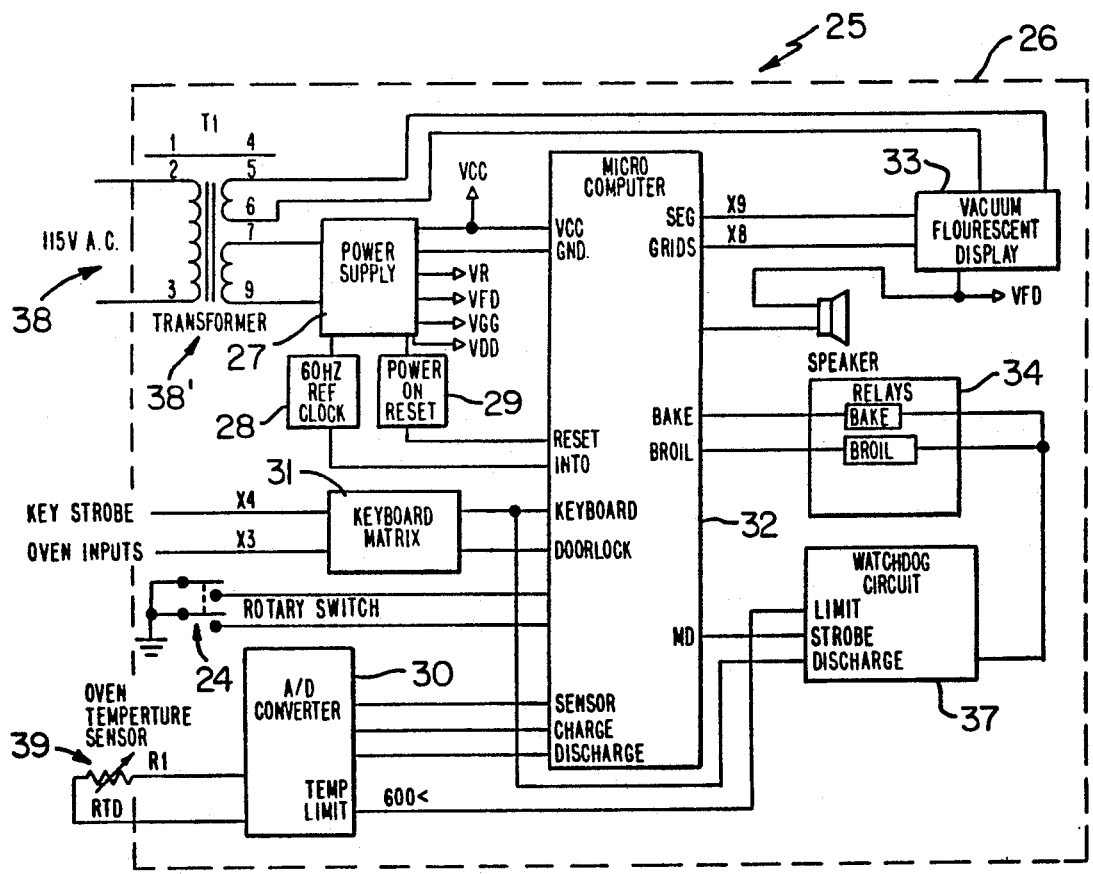
FIG. 2 is a block diagram illustrating the various circuit sections of the electrical circuit means of the control system of this invention for use in the control unit of FIG. 1, FIG. 2 being in block form and illustrates how the electrical circuit means is interconnected to external components to operate the same.

The control unit 20 has an electrical circuit means or control system of this invention therein which is generally indicated by the reference numeral 25 in FIGS. 2 and 4, the system or circuit means 25 being schematically illustrated by the dashed block 26 in FIG. 2 and containing sections of the electrical circuitry 25 as blocks 27, 28, 29, 30, 31, 32, 33, 34 and 37.

The block 27 comprises the electrical power supply for the control unit 20 and is adapted to be interconnected to an external power supply 38, FIG. 2, which comprises a Class 2, 120 V A.C. power transformer 38', the outputs of the power supply block 27 for the circuit 25 being −VR, −VFD, VCC, −VDD and −VGG.

The block 28 comprises a 60 hz reference generator to provide the real time reference signal utilized by the control unit 20 and the block 28 comprises a power on reset to provide a reset state for the control unit whenever insufficient voltage is available to properly power the control unit 20.

The block 30 is an A/D converter and is adapted to be interconnected to an external RTD temperature sensor 39 for the oven (not shown) of the cooking apparatus (not shown) using the control unit 20.

The block 31 is the user interface means of the circuitry 25 that contains the seven push buttons on keys S1-S7.

The rotary switch 24 is shown separate from the block 31 in FIG. 2.

The block 32 comprises a microcomputer that is hereinafter referred to as U2 in this description and in FIG. 4 of the drawings, the microcomputer being conventional in the art and being programmed to function in a manner hereinafter set forth.

The block 33 comprises the display means 22.

Figures 3, 4A:
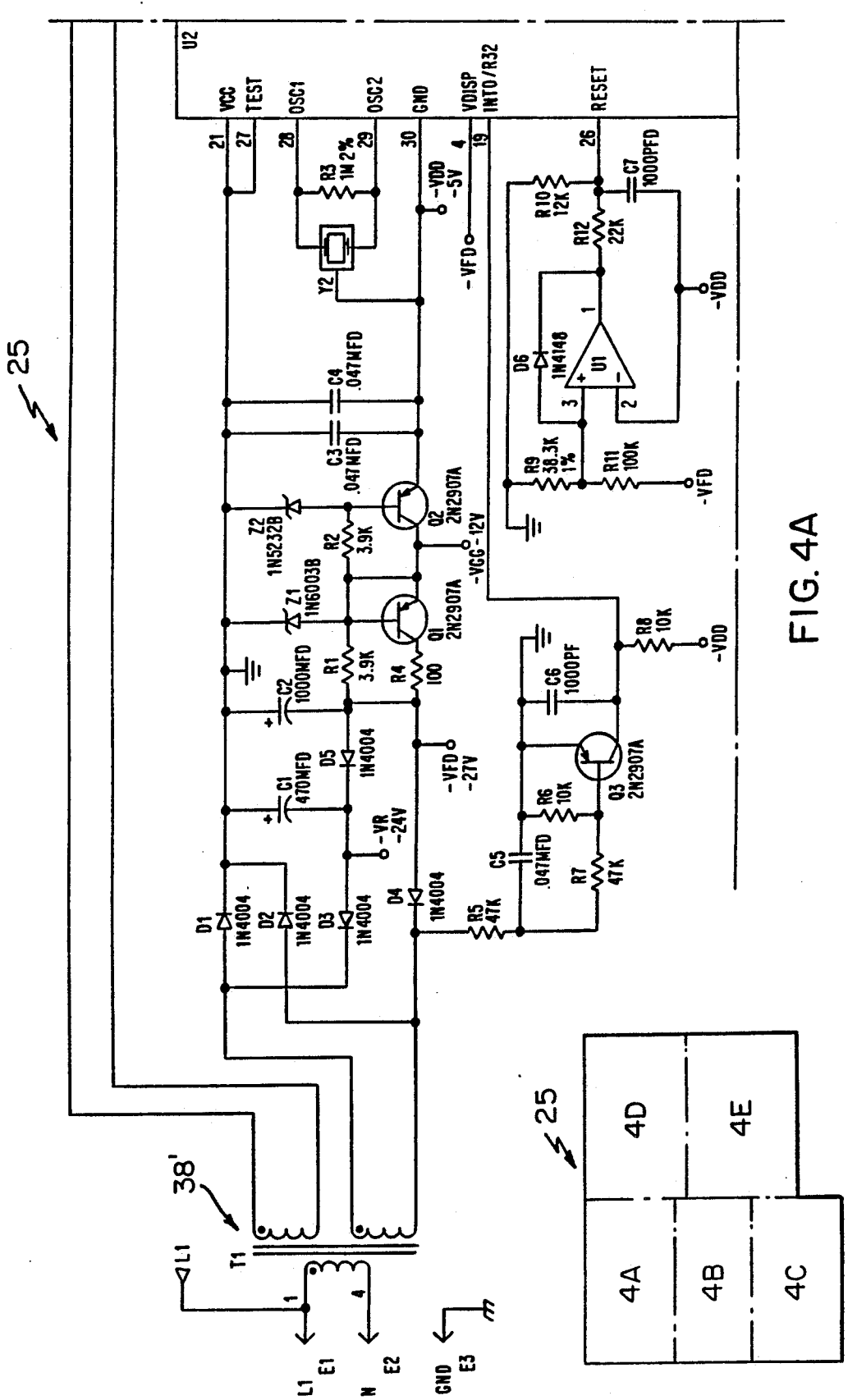
FIG. 3 is a block diagram illustrating how
FIGS. 4A, 4B, 4C, 4D and 4E are to be arranged in order to illustrate the entire circuit means of the control system of this invention.
Figure 4B:
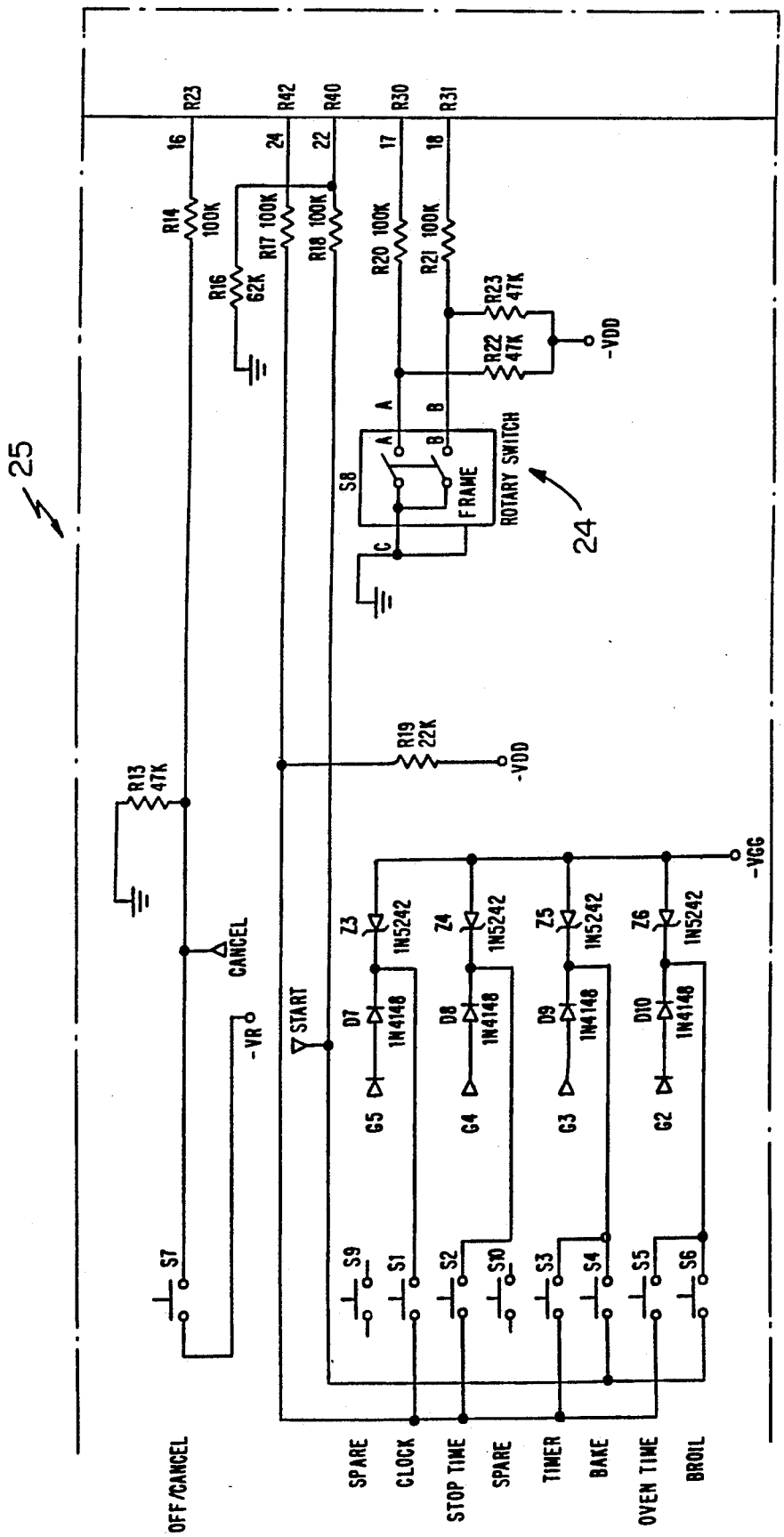
Figure 4C:
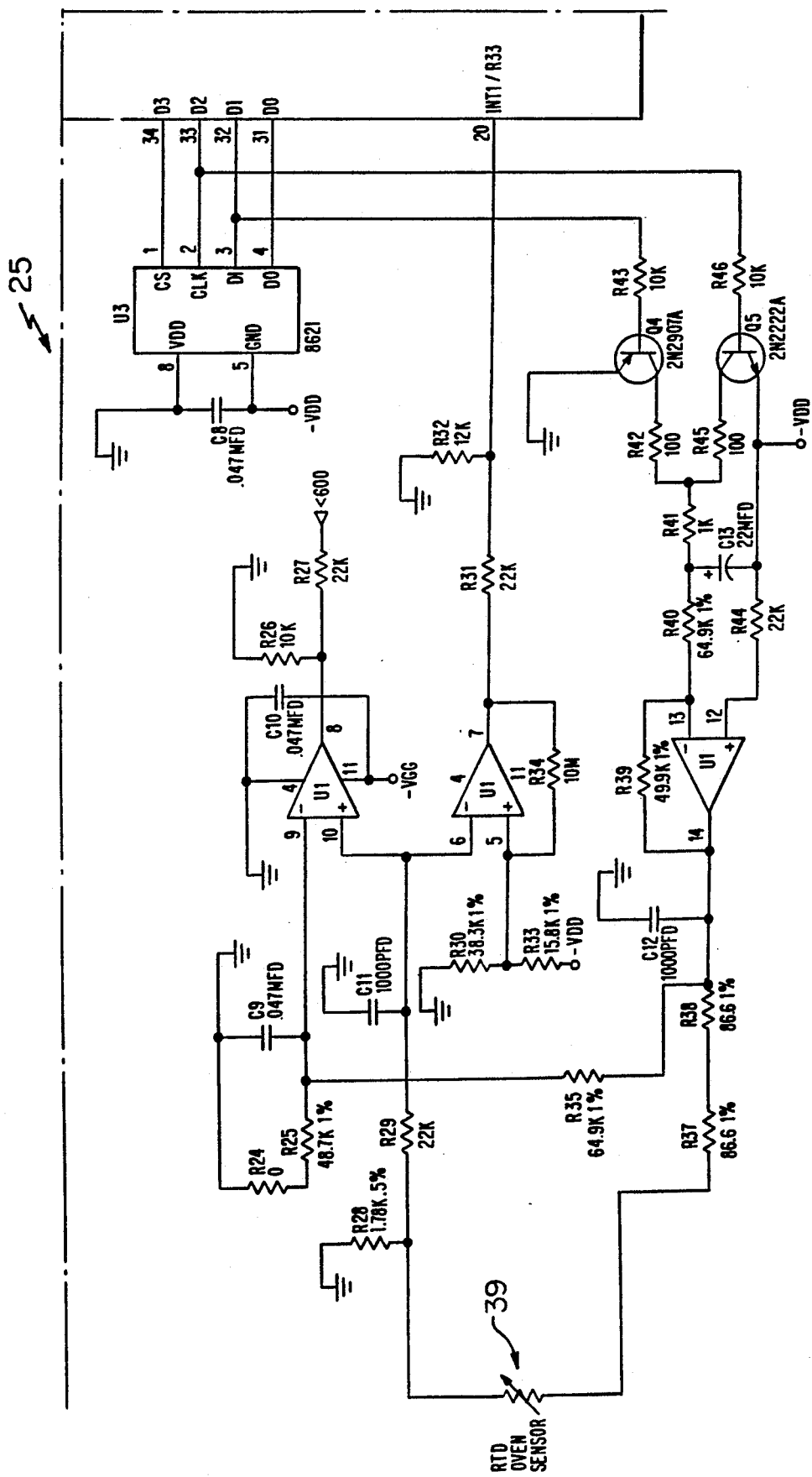
Figure 4D:
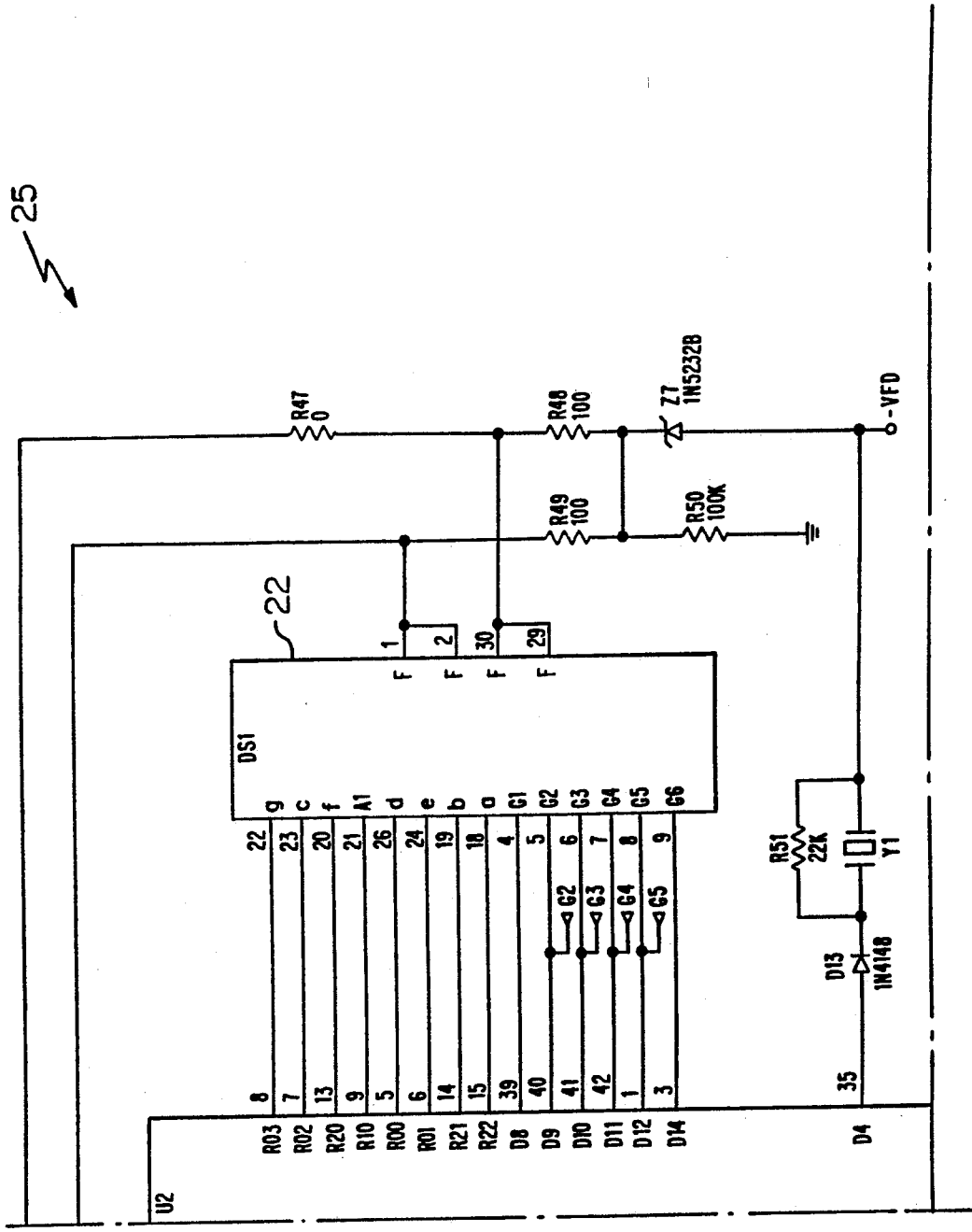
Figure 4E:
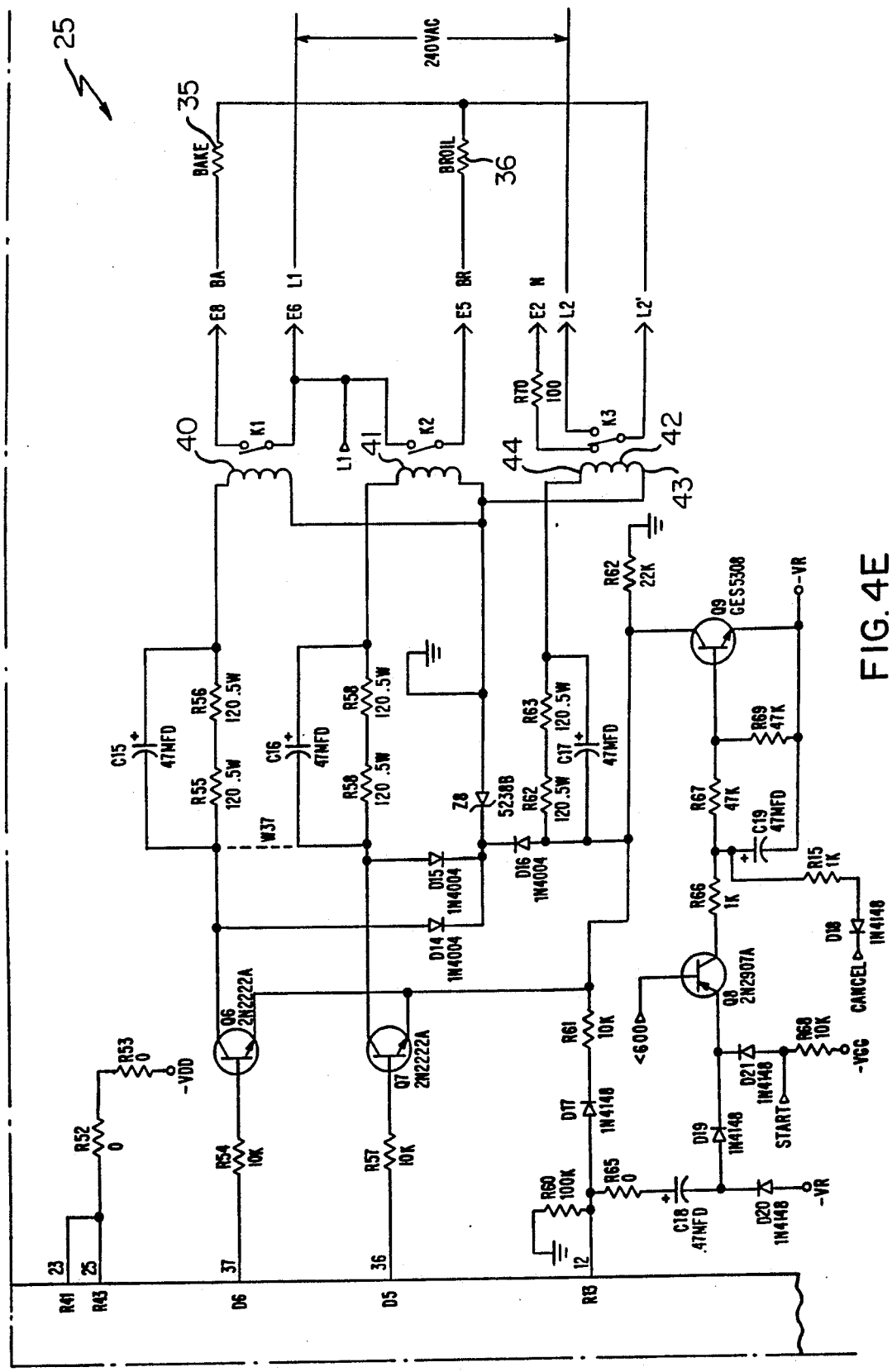

The block 34 comprises an oven interface means that has two outputs for respectively operating externally interconnected relays K1 and K2, FIG. 4E, which, in turn, respectively activate the oven bake element 35 and oven broil element 36.

The two outputs of the block 34 that control the heating elements 35 and 36 must pass current through a block 37 comprising a watchdog circuit that supplies redundant control of the heating elements by requiring a mechanical key closure prior to allowing power to reach the relays that control the heating elements in a manner hereinafter set forth.

In general, the system 25 of this invention is the same as the system 25 of the aforementioned Kadwell et al, U.S. Pat. No. 4,782,215 whereby the patent is being incorporated into this application by this reference thereto.

Therefore, the system 25 of this invention will now be described in detail with the understanding that certain details of the components and the operation thereof that are not fully described hereinafter can be obtained from the aforementioned U.S. Pat. No. 4,782,215.

In the following description of the system 25 as illustrated in FIGS. 4A-4E, all diodes are indicated by the reference letter D followed by a reference numeral, all resistances are indicated by the reference letter R followed by a reference numeral, all capacitors are indicated by the reference letter C followed by a reference numeral, and all transistors are indicated by the reference letter Q followed by a reference numeral. Also, unless otherwise indicated in the drawings, all capacitance values are in microfarads, 20% 50 V; all diodes are 1N4148 and all resistance values are in ohms, + or −5%, 0.25 watt.

The power supply block 27 is of conventional construction as illustrated in FIG. 4A and provides these voltages.

The −VFD supply is an unregulated voltage source of approximately 27 V D.C. and supplies to the vacuum fluorescent display 22, the tone generator Y1, and the −12 and −5 volt regulators. Diodes D1, D4, and capacitor C2 are the primary components, forming a half-wave, capacitive input circuit. The large capacitor C2, 1000 microfarad, is required because of the long power interruption withstand requirement placed on this design. Sufficient energy must be stored to allow continued microcomputer operation, without reset, for a maximum of 3.5 seconds after power is removed. To improve this ability still further, the diode D5 also couples energy from the 470 microfarad capacitor C1 in the −VR supply in the event of a power dip. This has practical value only if the relay outputs are off at the time of power interruption. Due to the configuration of diodes D1-D5, the −VFD supply is independent of the −VR supply. The two supplies are charged from opposite phases of the incoming A.C. voltage. This minimizes voltage fluctuations as loads change and balances the load placed on the power transformer 38'. The power transformer 38' must be of Class 2 construction and its output must be approximately 21 V A.C., 50/60 hz.

The −VR supply is of similar configuration to the −VFD supply. Its purpose is to provide power for the 24 V D.C. relay coils. The components comprising this circuit are diodes D2 and D3, capacitor C1, and the power transformer 38'. It will provide approximately −24 V D.C. when loaded with 80 ma. of coil current from the relays.

The −VGG supply provides a regulated source of low current −12 V D.C. It consists of resistors R1 and R4, transistor Q1 and Zener diode Z1. Unregulated −27 V D.C. from the −VFD supply is applied to the collector of transistor Q1 through current limit resistor R4. The base of transistor Q1 is tied to the junction of resistor R1 and Zener diode Z1, which form a voltage divider producing a stable −12.6 V D.C. derived from the −VFD supply. The circuits being powered by this supply become the emitter resistor for transistor Q1, whose current gain provides a stable source of voltage that is 0.6 V D.C. higher (due to Vbe saturated) than the reference voltage provided by Zener diode Z1. Hence, the −VGG supply is a source of −12 V D.C. which maintains the voltage under varying load conditions. The main purpose of this supply is to provide proper power and regulation for use by the A/D circuitry which decodes oven temperature. It is also used as a preregulator for the −VDD supply, which powers the microcomputer.

The −VDD supply provides a regulated source of low current −5 V D.C. It consists of resistor R2, Zener diode Z2, and transistor Q2. The power on reset circuitry is an integral part of this supply. Regulated VGG supply (−12 V D.C.) is applied to the collector of transistor Q2. The base of transistor Q2 is tied to resistor R2 and the emitter of transistor Q1 producing a stable 5.7 V D.C. derived from the −VGG supply. The circuits being powered by this supply become the emitter resistor for transistor Q2 whose current gain provides a stable source of voltage that is 0.6 V D.C. higher (due to Vbe saturated) than the reference provided by transistor Q1. Hence the −VDD supply is a source of −5 V D.C. which is very stable due to the fact that the input source is already regulated. The main purpose of this supply is to provide proper power and regulation for use in the microcomputer U2.

The power on reset circuit 29 provides a single pulse that is applied to pin 26 of the microcomputer U2 which is the reset input of the microcomputer U2. The function is to provide monitoring of the −VFD supply and to place the microcomputer U2 in a reset state whenever insufficient voltage is available to properly power the device. It does this by driving the pin 26 of the microcomputer U2 high under insufficient voltage conditions, which is the reset state of this input. Resistors R9 and R11 form a voltage divider placing the instantaneous −VFD supply voltage on pin 3 of an op-amp U1. The other input of the op-amp U1 is tied to the resistors (−5 V) supply. After power is applied to the control, the −VFD supply voltage rises at a rate that depends on the value of capacitor C7 and the characteristic impedance of the power transformer 38'. The op-amp U1-1 is in a high state initially because the divider action on the input U1-3 slows the rate of voltage rise compared to the input U1-2. Upon reaching approximately 18 V D.C., the voltage at the op-amp input U1-3 becomes more negative than the op-amp input U1-2 which is tied to the −5 volt supply. This causes the output U1-1 to switch to a low output condition. Diode D6 provides a latching action by pulling the input U1-3 greatly negative once the output has switched to a low state. This latching action prevents oscillation of the circuit at borderline trigger voltage. It also provides hysterisis action which avoids resetting the microcomputer U2 until just before the −5 volt supply falls out of regulation. This delays the decision to reset from a powered state as long as possible to allow the 4 second power loss withstand capability. Resistors R10 and R12 form a level shift circuit to protect the −5 volt reset input of the microcomputer U2 from the −12 volt swing of the op-amp U1. Resistor R10 is a pull-up resistor for output U1-1, which assures proper logic levels and initial state of output U1-1.

The 60 Hz reference generator circuit 28 provides the real time reference signal used by the microcomputer U2 to generate accurate Time of Day Clock, Timer, and other functions requiring consistent real time response. It is basically an inverting, single transistor amplifier, driven to saturation by a signal derived from the A.C. power line. This signal is taken directly from the power transformer 38'. It is conditioned through a low pass filter to prevent errors due to electrical noise on the A.C. line, before being applied to the base of transistor Q3. The filter consists of resistors R5, R6 and R7 and capacitor C5. Transistor Q3 inverts and squares up the incoming sinusoidal waveform before applying the resulting square wave signal to pin 19 of the microcomputer U2. Resistor R8 is merely a pull-down resistor, allowing the collector of transistor Q3 to swing between 0 and −5 V D.C. Capacitor C6 is used to decouple radiated RFI, which could upset timing accuracy if not suppressed. Since failure of this circuit 28 would result in the microcomputer U2 losing the capability to keep accurate time, this input is supervised in software. Inhibiting this signal will result in the error code -F6- being displayed, an audible alarm, and all outputs shut down.

The A/D circuit 30 utilizes a software algorithm or program executed by microcomputer U2 which monitors a closed feedback loop consisting of an integrator, amplifier and comparator to decode the resistance of the RTD sensor 39 into a digital format. This process is achieved using a pulse width modulation technique also referred to as a charge pump. The charge pump conversion technique is based on the principal of a closed feedback loop that applied equal duration charge or discharge pulses to an RC network in a manner that establishes and maintains a voltage across an integrating capacitor C13, FIG. 4C, that is proportional to a reference voltage. The integrated voltage across the capacitor C13 is buffered by the inverting op-amp U1 and is applied to a voltage divider consisting of the RTD sensor 39 and a reference resistance R28. The output of this divider is compared to a reference voltage which provides an error logic to the microcomputer U2 to complete the feedback loop. The ratio of charge to discharge pulses over a specified count length can be used to decode the RTD sensor resistance which is included in the feedback loop.

The RTD sensor 39 used to sense oven temperature can be a silicon, platinum, nickel, or other positive temperature coefficient RTD sensor. These devices are reasonably linear as to change in ohms per change in unit temperature (about 4.54 ohms/°F. for a typical silicon sensor and 2 ohms/°F. for a typical platinum RTD sensor). To decode temperature readings, a temperature sensor is commonly excited with a constant current source and the voltage that results tracks the temperature change linearly. It was found, according to the teachings of this invention, to be more advantageous to modify this scheme. Rather than excite the RTD sensor 39 with a constant current, it is excited with the variable voltage of a D/A converter. This variable voltage of the D/A converter is in a feedback loop that increases or decreases the voltage applied across the RTD sensor 39 and the reference resistor R28 to maintain a constant current and resulting constant reference voltage across the reference resistor R28. As the temperature of the RTD sensor 39 increases, its resistance increases, and the voltage required to achieve a constant reference current through the RTD sensor 39 and reference resistor R28 also increases. The constant current through the RTD sensor circuit thus results in an accurate voltage across the reference resistor R28 which has a precision tolerance of 0.5%. This voltage is applied through impedance matching resistor R29, to the op-amp inputs U1-6, U1-10 and is compared to a reference voltage established by the voltage divider R30/R33 at the op-amp input U1-5. The op-amp comparator error logic output U1-7 is monitored by the microcomputer U2 to provide the variable D/A voltage which will be described later. Resistor R32 acts as pull-up to assure proper logic levels for the microcomputer U2. Resistor R34 provides a little positive feedback to the op-amp U1 to speed the transition rate of the comparison. Capacitor C10 is a decoupling capacitor for the op-amp U1.

The microcomputer U2 is programmed to use the error logic of comparator output U1-7 to maintain a voltage across capacitor C13 at a level that is proportional to the temperature versus resistance being measured by the RTD sensor 39. The error logic of the op-amp output U1-7 is fed into a microcomputer input U2-20 through a buffer resistor R31.

When the voltage across resistor R28 is more negative than the reference voltage at the comparator input U1-5, the comparator output U1-7 swings high and signals the microcomputer U2 to execute discharge pulses to capacitor C13. This decreases the voltage across capacitor C13 and via the series feedback loop of inverting amplifier output U1-14, resistors R38 and R39, and the RTD sensor 39, the voltage across resistor R28 will eventually become more positive than the reference voltage at comparator input U1-5. When the voltage across resistor R28 is more positive than the reference voltage at the comparator input U1-5, the comparator output U1-7 swings low and signals the microcomputer U2 to execute charge pulses to capacitor C13. The charge and discharge pulses are short single shot pulses with an equal specified time duration, such as 500 microseconds. This charge/discharge pulse process is repetitive and develops a variable D/A voltage across capacitor C13 which tracks the magnitude of the RTD sensor resistance to maintain a subsequent constant voltage across the reference resistor R28 as explained earlier.

The microcomputer program keeps a summation of the quantity of charge pulses versus discharge pulses over a specified count length of charge/discharge pulses, such as 512 counts for a resolution of 9 bits. Other resolutions can be implemented by increasing or decreasing the count length, such as 1024 counts for 10 bit, and 256 counts for 8 bit. The binary ratio of charge and discharge pulses necessary to maintain the constant current level through the temperature sensor 39 and reference resistor R28 is decoded through software as a temperature value. The circuit can be scaled through software and hardware such that each count represents a corresponding gradient of temperature, such as the 1.6° F./count of the illustrated circuit. With a specified count length of 9 bits or 512 counts and 1.6° F./count, the temperature conversion range of illustrated circuit is approximately 819° F. This range can be matched to the desired operating resistance range of the RTD sensor 39 by means of hardware and software. Other combinations of software and hardware can be used to achieve greater or less resolution per count and greater or less temperature conversion range.

As noted earlier, one shot charge and discharge pulses of equal pulse duration are generated by the microcomputer U2. The charge pulses are generated via the microcomputer output U2-32 which applies a low logic level (−5 V D.C.) pulse to the base of transistor Q4 through resistor R43. This turns on transistor Q4 which applies a power supply ground potential to resistors R42 and R41 to charge capacitor C13 to a more positive potential. The discharge pulses are generated via microcomputer output U2-33, which applies a high logic level (0 V D.C.) pulse to the base of transistor Q5 through resistor R46. This turns on transistor Q5 which applies a −5 V D.C. power supply potential to resistor R45 and R41 to discharge capacitor C13 to a less positive potential. This technique provides an integrated variable D.C. voltage proportional to the ratio of the charge versus discharge pulses, provided the RC time constant is sufficiently large relative to pulse period.

The output of the pulse width modulation network is fed into an input resistor R40 of co-amp U1-13 which is configured as a negative feedback inverting amplifier circuit with −5 volt at the op-amp reference input U1-12. The inverting amplifier circuit has a feedback resistor R39 and which sums with input resistor R40 to give a closed-loop gain of 0.769. Since this gain is selectable, the gain is preferably selected to match the slope of the D/A conversion to the temperature coefficient and/or resistance versus temperature slope of the RTD sensor 39. Therefore, this circuit has means of matching the slope and/or gain of the D/A conversion circuit to the slope of the sensor means such that a change of resistance versus temperature can be tracked by a corresponding change in voltage from the op-amp U1 inverting amplifier circuit which will result in a substantially accurate conversion of resistance to temperature by means of the closed-loop system previously described.

The output of this op-amp stage U1-14 is a variable D.C. signal which has a range of −5 V D.C. to a maximum of −11 V D.C. The inverting effect of the amplifier also provides a continuous offset bias of greater than −5 V D.C. This continuous offset bias is beneficial with regard to providing a signal that is always greater than the common mode input range of the comparator input stages of the circuit.

The op-amp output U1-14 is used to apply a variable voltage to the oven sensor 39. Resistors R37 and R38 are inserted in series with the RTD sensor 39 and serve to buffer the op-amp U1 from abuses of the outside world by providing a measure of current limiting. The value of these resistors R37 and R38 is selected such that a single component failure does not result in oven temperature exceeding the maximum set point by 50° F. Shorting either resistor R37 or R38 will result in a typical 21° F. positive calibration error. Capacitor C12 provides protection from high frequency disruptions. The other end of the RTD sensor 39 is connected to resistor R28, which returns the RTD sensor circuit to board common. Resistor R28 is a precision, low temperature coefficient resistor which provides a feedback control voltage as explained earlier.

The feedback control voltage across resistor R28 is compared to a reference voltage established by the voltage divider R30/R33. This reference voltage established by the voltage divider R30/R33 is not a precise absolute value, but instead has a ratiometric relationship to the RTD sensor circuit voltage developed across resistor R28. It is approximately −3.813 volts when the −5 volt supply is at exactly −5 volts. The variable D/A output of U1-14 and subsequent feedback control voltage developed across resistor R28 is also ratiometric to the power supply voltage. This is the result of the charge pump switching being referenced to the ground and −5 V D.C. power supply rails. Because of the ratiometric relationship, the D/A output and the reference voltage will track accurately, independent of power supply voltage. This eliminates the need for a tightly controlled power supply to maintain accuracy.

Thus it can be seen that the microprocessor U2 is implemented with a series feedback loop consisting of an integrating RC network, an inverting amplifier, an RTD sensor/reference resistor divider, and an analog comparator and is used to convert an unknown RTD resistance into a known variable D/A voltage by monitoring the ratio of charge to discharge pulses required to develop a corresponding voltage across the capacitor C13 of an integrating RC network. This charge/discharge action provides a variable D/A voltage output at the op-amp output U1-14, where every output code presents a known, accurate, analog voltage that corresponds to a known RTD sensor resistance.

The A/D conversion technique is accurate and linear over a large segment of the full scale range. The circuit is designed to be ratiometric to take advantage of this technology's inherent close tracking over a wide range of temperature and power supply fluctuations. Therefore a major asset of this design is the inherent accuracy and repeatability of the controller over wide temperature and power supply fluctuations without compensation or calibration adjustments. The normal aging characteristics of the components such as capacitor C13, also has minimal effect on accuracy.

The variable D/A voltage out of the op-amp output U1-14 also provides a bias for a redundant 600° F. limit hardware limit, which inhibits operation of the watchdog circuit 37. The op-amp output U1-14 is applied to two voltage divider circuits, R38 +R37+Sensor 39/R28 and R35/R25, which are minitored by comparator inputs U1-10 and U1-9. The ratio of these voltage dividers is such that, a sensor resistance equivalent to 600° F. (or other selected limit), will result in equal voltage at the comparator inputs U1-9 and U1-10. The sensor 39 has a positive resistance temperature coefficient, and when the temperature of the sensor 39 exeeds 600° F., the (+) input of the comparator U1-10 becomes more positive than the (−) input of the comparator U1-9 which is sourced by the fixed ratio of R25/R35. This results in a high logic state (0 V D.C.) at the comparator output U1-8 which provides turn off bias to the base of transistor Q8 via resistors R26 and R27. Thus when the RTD sensor temperature is greater than 600° F., transistor Q8 is turned off which inhibits dynamic coupled pulses from the microcomputer U2 and turns off the watchdog transistor Q9. The operation of the redundant hardware temperature limit is explained in more detail hereinafter.

The hardware limit of 600° F. is always in effect and is not dependent on the instantaneous voltage level of the D/A conversion output U1-14. The comparator inputs U1-9, U1-10 have a common mode input range of −1.5 V D.C. to −VGG. If a failure of the D/A conversion voltage range (−5 V D.C. to −11 V D.C. at U1-14) results in the comparator input voltage becoming more positive than the −1.5 V D.C. common mode input, the inherent design of the op-amp/comparator U1 will force the output to a high logic state at U1-8, which inhibits the watchdog operation in the off state. Other means, such as clamping the op-amp output of U1-14 to the −5 V D.C. power supply with a diode can also be used to assure that the common mode input range of the comparator inputs have sufficient bias to keep them in the safe operating range.

Oven temperature is also tested against software limits during each D/A conversion of the oven temperature. If the oven cavity temperature is within the proper limits for the operation being performed, this test generates a dynamic signal used by the oven element watchdog circuitry 37. However, if the oven temperature exceeds a software selectable runaway limit, the dynamic signal at pin 12 of microcomputer U2 is inhibited and thereby causes transistor Q9 to turn off and provides an F2 alarm in the display 22.

The user interface circuit module 31 contains the rotary switch 24 and seven inputs for the seven external momentary contact push button switches S1-S7. Appliance operation is programmed by the user through use of these switches S1-S7 and 24.

The rotary switch 24 generates a two digit binary signal that is fed through resistors R20 and R21 into the microcomputer inputs U2-17 and U2-18. Resistors R22 and R23 are pull down resistors to −VDD so that proper logic level signals are generated. The microcomputer software decodes which direction the rotary switch 24 is being turned and increments or decrements the displayed reading accordingly at display 22.

The six external momentary contact switches S1-S6 are used to select which function the input from the rotary switch 24 will program. Resistors R17 and R18 are buffering/coupling resistors to the microcomputer U2 from these input switches. Each switch entry is activated by its assigned grid pulses G2 through G5. Resistors R16 and R19 provide a pull down voltage of −5 volts for each input switch.

The Bake and Broil function keys S4 and S6 are monitored in software for short circuit conditions that could cause unattended appliance operation. The Bake and Broil keys S4 and S6 are also connected to the element watchdog circuit 37 as will be apparent hereinafter.

One unique key is the Cancel key S-7. Because this design relies on this switch S-7 to provide a reliable, single button cancel of oven operation, its function is duplicated in hardware as well as software. The key is connected directly to the element watchdog circuit 37 as well as to the microcomputer U2. If resistor R14 fails open or the microcomputer input port fails there will be no effect on ability of the cancel key S-7 to turn all the elements off. If resistor R15 or diode D18 fail open the cancel key S-7 will still input to the microcomputer U2.

The vacuum fluorescent display circuit 22 is the means by which controller operating information is visually displayed. It consists of display DS1, resistors R47, R48, R49 and R50, and Zener diode 27 in addition to the microcomputer U2. The resistors and Zener diode are used to properly bias the filament of the display. The content of displayed information depends on the microcomputer U2, which uses a conventional multiplexing scheme to drive the 6 grid by 8 segment display.

An EEPROM circuit is provided for the control device 20 and consists of an EEPROM U3 that is a 16 by 16 bit device, and a de-coupling capacitor C8. It provides a means of sorting various options that modify the default feature options of the program stored in the microcomputer U2. The control will operate without this device installed according to the default feature set. When the EEPROM U3 is installed, all aspects of controller operation that are desirable to be adjustable, may be customized for specific needs. In the area of temperature regulation, these adjustments are limited to +/−35° F. each. In addition, upon power loss, the time of day is saved, allowing the control to power back up with the time of power failure in the display. This mimics mechanical clock operation.

Pin 1 of the EEPROM U3 is the chip select line of the EEPROM U3. A synchronous clock signal generated by the microcomputer U2 is fed into pin 2. Pin 3 of the EEPROM U3 is the serial communication line for communicating to the device. Pin 4 of the EEPROM U3 is the data out serial port by which information is extracted from the EEPROM U3.

If the microcomputer U2 reads a consecutive string of all logic 1's or 0's when reading in data from the EEPROM U3, the software assumes no options are selected and the control operates according to the default set of operation parameters. In this manner, the failure of this part does not affect appliance operation from a safety standpoint.

Even though the EEPROM U3 is capable of non-powered data retention for a minimum of 10 years without refresh, an added precaution is taken to assure that the initial options remain unchanged for the life of the appliance. During the cool down period following a period of high temperature operation, the microcomputer U2 first reads and then stores in RAM, all of the option information. It then performs a refresh cycle by writing the information just obtained, back into the EEPROM U3. This action is similar to charging a rechargeable battery. In a normal usage situation, this will assure that the EEPROM U3 will not suffer data loss with time.

The tone generator comprises a piezo-electric speaker Y1 that is run directly by the microcomputer U2. The tone frequency is controlled by switching the state of the microcomputer output U2-35. Nominal speaker frequency is 2.45 KHZ. The microcomputer U2 controls tone duration by inhibiting this oscillation. The output U2-35 is coupled through diode D13 to the oscillator. The diode D13 buffers the output from the positive voltage spikes generated by the inductive Piezo element. Resistor R51 provides current shunt to discharge the RCL of the Piezo element.

The oven interface consists of two relay outputs and three inputs. The outputs are simple transistor drivers Q6 and Q7 which activate external relays K1 and K2, which in turn activate the oven elements 35 and 36. The inputs monitor external switches.

When a Bake or Broil cycle is selected the corresponding output relay Q6 or Q7 is energized. The relays K1 and K2 are cycled under microcomputer control to generate the desired oven cavity temperature for the entire cycle.

The Bake output driver circuit is composed of resistors R54, R55 and R56, capacitor C15, transistor Q6 and diode D14. When the microcomputer output, pin 37, is switched to a logic high and the element watchdog circuit 37 is active and functioning properly, transistor Q6 switches power from the −VR supply into the K1 relay coil 40. Diode D14 protects transistor Q6 from inductive kickback from the relay coil 40 at turn off. Capacitor C15 provides a voltage boost at turn on of the relay K1 for fast contact closure, and to assure pull in at high ambient temperatures. Resistors R55 and R56 provide a measure of current limiting for the relay coil 40 to reduce self heating in the coil 40 at the required hold in current. It was found necessary to use the two resistors R55 and R56 in series due to their self heating and derating at high temperatures.

The Broil output driver circuit is composed of resistors R57, R58 and R59, capacitor C16, transistor Q7 and diode D15. The microcomputer output is pin 36. The broil circuitry is identical to the bake circuitry and controls the relay coil 41.

A failure of these bake and broil circuits in the "on" condition would result in uncontrolled oven heating. Therefore redundant control of these output drivers Q6 and Q7 is provided. Before current from the −VR supply can be supplied to the relay coil 40 or 41, the element watchdog circuit 37 must be active and functioning properly.

The heart of the safety logic is contained in the watchdog circuit 37. The purpose is to supply redundant control of the heating elements 35 and 36, requiring a mechanical key closure prior to allowing power to reach the relays K1 and K2 that control the heating elements 35 and 36 and providing a hardware shut off to remove power from the relays K1 and K2. Once a cooking cycle has been initiated, a dynamic "keep alive" signal from the A/D circuitry 30 is required to sustain cooking. This dynamic signal is only generated if the microcomputer U2 is functioning sufficiently to operate the A/D circuitry 30 and therefore to regulate the oven temperature. In addition, the watchdog hardware is monitored through software to assure that the circuit 37 is functioning properly before allowing a heating mode to occur. This monitoring is continuous, and will result in a failure alarm should a fault be detected. Any single component fault of this circuit 37 will result in a safe shut down, with the user being required to repair the fault prior to restoring use of the oven.

Should a single component fault in the bake or broil relay driver circuits result in the microcomputer U2 being unable to shut the relays K1 and K2 off during temperature regulation, the temperature in the oven will rise until the bake temperature limits are reached. At this point the temperature limit comparator can no longer provide the dynamic pulse to the watchdog circuit. The watchdog circuit shuts off, and removes power from the relays in that manner. The microcomputer U2 also sounds an alarm, and displays an error code.

Transistor Q9, a darlington, is the redundant controlling element in series with the bake and broil relay driver transistors Q6 and Q7. The transistor Q9 must be on prior to either of these relay driver transistors Q6 and Q7 receiving power. In order to turn transistor Q9 on, the following sequence must occur.

The bake function key S4 or broil function key S6 must be pressed. When the broil function key S6 is pressed, a high logic level (0 V D.C.) is interfaced via the G2 strobe pin of the microcomputer U2-40 through diode D10, key 6 and diode D21 to the emitter of transistor Q8. When the bake function key S4 is pressed, a high logic level (0 V D.C.) is interfaced via the G3 strobe pin of the microcomputer U2-41 through diode D9, key S4 and diode D21 to the emitter of transistor Q8. Prior to pressing a function key, the emitter of transistor Q8 is normally biased to the −VGG power supply (−12 V D.C.) through resistor R68 and diode D21. If the RTD sensor resistance is less than the 600° F. hardware high temperature limit, the comparator output U1-8 will be a low logic state (−12 V D.C.) which provides this bias to the base of transistor Q8. Therefore, transistor Q8 is off prior to the closure of a function key. As explained earlier, when a function key S4 or S6 is pressed, the grid G2 or grid G3 strobes of the microcomputer U2 applies high logic level pulses to the emitter of transistor Q8 which turns on to pass the strobe pulses. When the transistor Q8 conducts at saturation, the collector current of transistor Q8 flows through current limiter R66, and into the junction of resistors R15 and R67 and capacitor C19. Here, the current splits two ways, one path charging capacitor C19 from the positive pulses applied to transistor Q8 emitter, and the other path flows into resistor R69 and the base of transistor Q9 to turn transistor Q9 on at saturation. The collector of transistor Q9 which is connected to the emitters of transistors Q6 and Q7, provides a current switch path to the −VR supply to "enable" the bake and broil relay drivers Q6 and Q7. The transistors Q6 and Q7 do not turn the relays K1 and K2 on until the microcomputer U2 instructs them to do so in the sequence.

The microcomputer U2 must recognize that a bake function key S4 or a broil function key S6 has been pressed. As explained earlier, pressing either of these keys will provide high logic level pulses to the anode of diode D21. This signal node is also interfaced through resistor R18 to the microcomputer input U2-22 which decodes the key closure. Using a software key debounce algorithm, the microcomputer U2 tests to assure that the function key S4 or S6 is held down long enough for capacitor C19 to receive an adequate charge. This assures that transistors Q8 and Q9 will remain "on" prior to release of the key S4 or S6. If the key S4 or S6 is not held long enough, the microcomputer U2 simply ignores the key entry and transistor Q9 turns off because capacitor C19 discharges when transistor Q8 turns off and inhibits the grid pulses that are passed when a function key S4 or S6 is pressed. When transistor Q9 is off the relay drivers Q6 and Q7 are disabled.

Assuming the key S4 or S6 has been properly pressed, the microcomputer U2 will decode it as an oven operating function and start the A/D operating circuit 30. As previously stated the A/D circuit 30 is testing the oven temperature. If the oven temperature is greater than 600° F. limit, the output of temperature limit comparator at the op-amp output U1-8 goes high to turn off the watchdog circuit 37 by turning off transistor Q8 as explained earlier. If the oven temperature is within limits, the microcomputer output U2-12 continuously generates high logic level strobe pulses (0 V D.C.) and checks for a high state at the collector of transistor Q9. This watchdog strobe signal pulses at about 120 Hz rate and is A.C. coupled through resistor R65, capacitor C18 and diode D19 to the emitter of transistor Q8. If the RTD sensor 39 is less than 600° F., transistor Q8 will pass these pulses to charge capacitor C19 and turn on transistor Q9 in a manner similar to the previous explanation of the strobe pulses from the function keys S4 and S6.

The microcomputer output pulse U2-12 provides a Pmos switch with low channel resistance to the ground potential of the power supply, and is independent from the watchdog circuit 37. These repetitive output pulses will be passed through capacitor C18 to provide a "keep alive" current flowing into capacitor C19, only if the transistor Q9 is on prior to the start of the watchdog output pulses. This is because a logic low pull down path is required to discharge capacitor C18 in order to pass the watchdog pulses. This discharge path circuit is configured such that transistor Q9 must be "on" to complete the path of capacitor C18 (+) through resistor R65, diode D17, resistor R61, transistor Q9, −VR supply node, and diode D20 back to capacitor C18 (−).

The high pulses from the microcomputer output U2-12 causes current to flow through the series circuit of resistor R65, capacitor C18, diode D19 and transistor Q8. Due to the relative values of capacitor C18 (0.47 microfarad) and capacitor C19 (47 microfarad), a single charge cycle will not produce sufficient voltage across capacitor C19 to energize transistor Q9, unless several more closely spaced pulses occur. Since capacitor C18 was previously charged and transistor Q9 turned "on" by a key input, the discharge path for capacitor C18 is also provided when output U2-12 is set to a low state logic, through the path of diode D17, resistor R61, emitter-collector of transistor Q9, and back through diode D20. This charge/discharge cycle allows current to flow from capacitor C18 into capacitor C19 on the next high pulse of the output U2-12. A pumping action results that charges capacitor C19 to an equilibrium value from −27 V D.C. to −12 V D.C. as long as the 120 Hz signal remains present. This is sufficient to keep transistor Q9 energized. If the temperature limit comparator is set high, the cancel key is pressed or watchdog output pulses stop toggling in either a high or low state, the pumping action of capacitor C18 into capacitor C19 stops and capacitor C19 then discharges into resistors R66, R67 and R69, resulting in transistor Q9 shutting off. This would require a key press before transistor Q9 could once again be energized.

To insure that no hardware malfunctions have occurred that would cause transistor Q9 to turn on without the proper key sequence and sustaining signal, a simple monitoring scheme is employed. The microcomputer U2-12 is also the watchdog monitor input. Through resistor R60, it checks the state of the collector of transistor Q9 on a continuous basis. An alarm sounds and the relay driver outputs are inhibited if the collector of transistor Q9 is in the wrong state for the present operating mode of the control. For example, if transistor Q9 is detected as being "on" for more than a few seconds with no cooking function selected, an alarm sounds and a characteristic failure code appears in the display. Conversely, if transistor Q9 is "off" during a legitimate cook cycle, the alarm also sounds and the mode is cancelled. This failure is not a safety concern, but it is a signal to the user that the appliance will not cook under this condition.

There is one more area of monitoring performed by the microcomputer U2 through the RTD sensor A/D circuit 30. Should a single component fault in the oven element relay driver circuits that result in the microcomputer U2 being unable to shut the relay K1 or K2 off during temperature regulation, the temperature in the oven will rise above the set point selected by the user. When the actual temperature reaches to the temperature limit, the microcomputer U2 stops the sustaining A.C. signal for the watchdog circuit 37, sounds an alarm and displays an error code. The watchdog circuit 37 shuts off, removing power to the relay K1 or K2 in that manner.

Through this handshaking arrangement of hardware and software, it is impossible for a single open or shorted component to cause an unattended start of the appliance. The failure analysis confirms that the watchdog circuitry 37 inhibits operation in the event of a microcomputer U2 failure and the microcomputer U2 protects against a hardware failure.

The supervisory transistor Q9 in addition to its previously described function can be utilized to energize a relay coil to provide a secondary switching function which results in a double line break function.

In particular, the circuit 25 of this invention as illustrated in FIG. 4E has a relay coil 42 for operating relay contacts K3, the relay coil 42 having one side 43 common to the ground potential and the other side 44 interfaced through resistors R63 and R62 which are in parallel with capacitor C17 back to the collector of transistor Q9.

In this manner, when transistor Q9 is initially turned on as previously described, the relay coil 42 will be energized which applies the potential at L2 through the normally open relay contacts K3 to the bake and broil elements 35 and 36 while the relays K1 and K2 are cycled by the transistors Q6 and Q7 under the control of the microcomputer U2 to provide temperature regulation to the desired set point.

Since the transistor Q9 is initially operated by the momentary closing of the selector key S4 or S6, transistor Q9 operates relay coil 42 before relay coils 40 and 41 are operated. This is desirable to minimize the wear out of the relay contacts of K3 which is preferably only operated for both make and break when the other side of the line is disconnected.

Having the double line break feature also provides a redundant safety disconnect when a runaway temperature is detected by the transistor Q8, which is driven by the comparator output U1-8 as previously described, which turns off transistor Q9 to deenergize relay coil 42 and disconnect the L2 side of the line from the bake and broil elements 35 and 36 even though the contacts of relay K1 and K2 may have failed in a catastrophic mode, such as contact welding.

In addition to this redundant high temperature limit disconnect of the double line break, relay coil 42 also provides a heater element disconnect should the other supervisory function of the watchdog circuit 30 turn off transistor Q9 as previously set forth.

Relay contacts K3 are preferably a single pole double throw configuration which provide a conductive path to the neutral potential when the relay coil 42 is deenergized. A resistor R70 is also included in this path to provide current limiting and a fuse-like function when the bake and broil elements 35 and 36 are abnormally energized by the L1 side of the line. This conductive path provides a means of testing the elements 35 and 36 and associated wiring for high voltage breakdown as required by some listed agencies.

Figure 5:
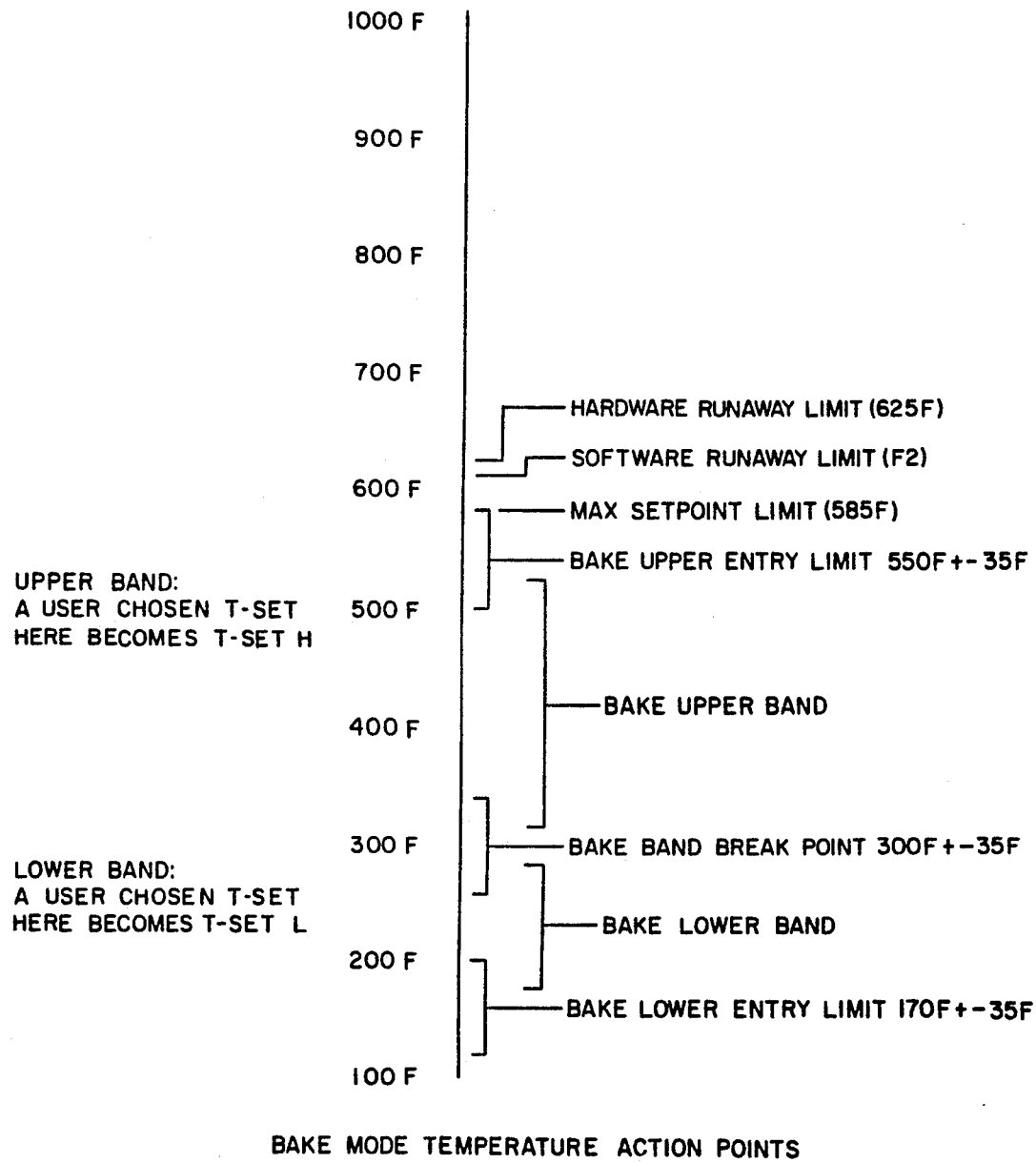
FIG. 5 is a bar graph that illustrates the bake mode temperature action points of the control unit of FIG. 1.
Figure 6:
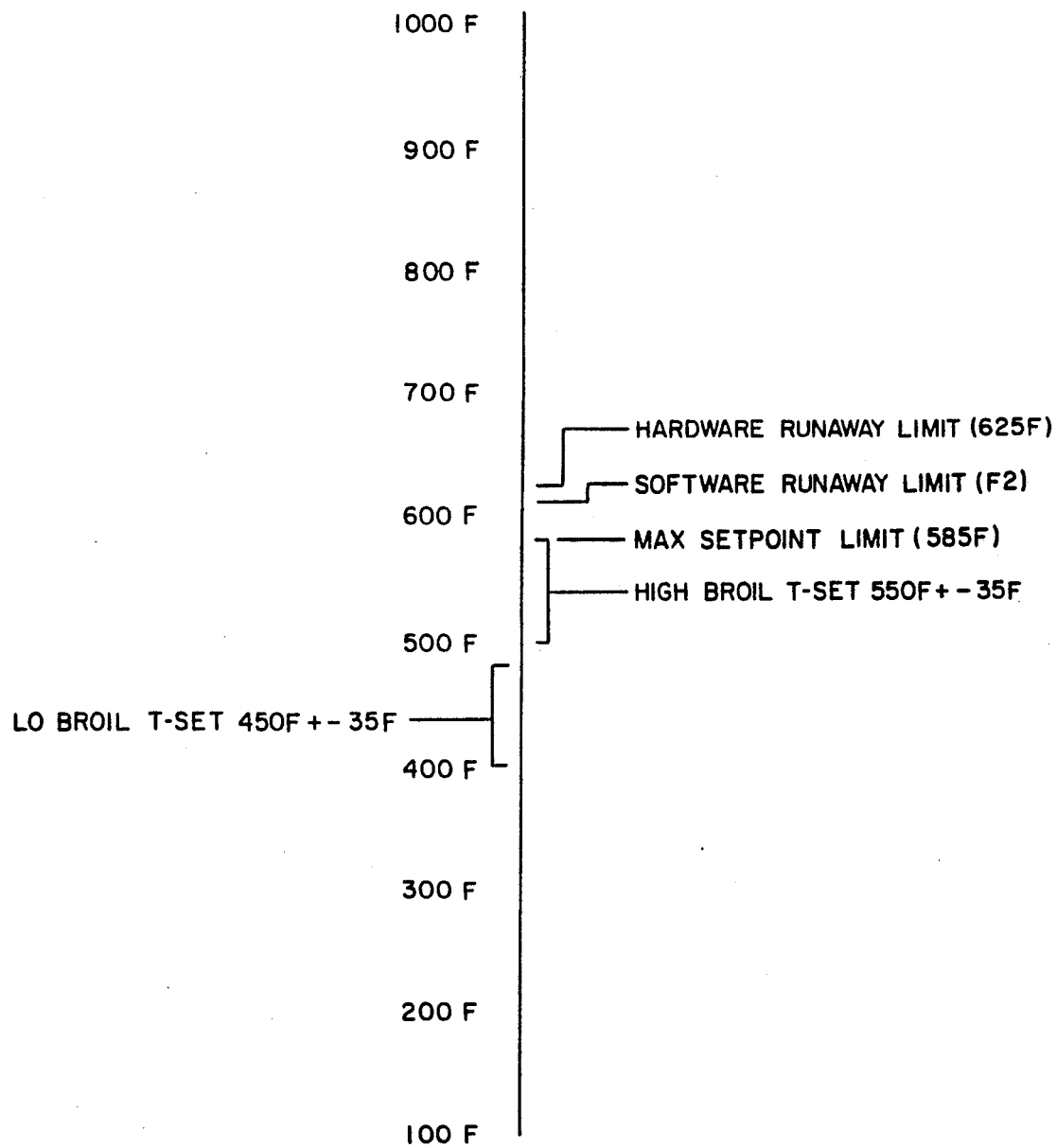
FIG. 6 is a bar graph that illustrates the broil mode temperature action points of the control unit of FIG. 1.

The control system 25 incorporates a maximum temperature setpoint limiting algorithm to assure that the cooking setpoint temperature will always be maintained within a specified range, such limit being designated as "Max Setpoint" in FIGS. 5 and 6.

As set forth in the aforementioned patent to Kadwell et al, U.S. Pat. No. 4,782,215, parameters that dictate the operation of Bake and Broil mode are nominally programmed in the ROM memory of the single chip microcomputer U2. The EEPROM U3 stores values that offset these parameters. It is possible to operate the control unit 20 in an oven without the EEPROM U3. The EEPROM values are retained indefinitely when all power is removed which lends itself to the tailoring of a generic control to a particular customer's needs in short turn around time.

Values stored in the EEPROM U3 can only cause offsets to a maximum of plus/minus 35° F. when used with the control unit 20 of this invention, the usage of the nonvolatile EEPROM memory is to retain operating parameters of the control unit 20 through software.

1. Bake mode parameters—relay on/off temperatures.

The ability to form specific relay on and off temperatures for a chosen cook temperature gives the ability to mimic any control system presently in use. It has been found that the control unit 20 can perform as replacement of, as well as surpass the performance of, mechanical thermostats.

A set temperature (T-set) chosen by the user from the rotary dial 24 as viewed in the red VFD digits of the display 22 will fall into either an Upper band or Lower band. The lower band is a range from the lower entry limit (170 nominal) to the Band Break point (300 nominal). The upper band is a range from the Band break to the upper entry limit (550 nominal). (FIG. 5) Two bands are desirable for optimal compensating of oven cavity losses at high temperatures vs. low temperatures while holding a precise temperature swing at lower temperatures.

Figure 7:
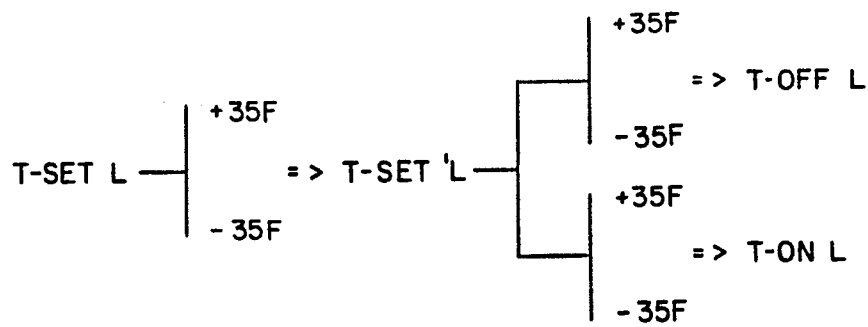
FIG. 7 is a bar graph that illustrates the formation of the heating element relay T-on and T-off temperatures of the control unit of FIG. 1.
Figure 7:
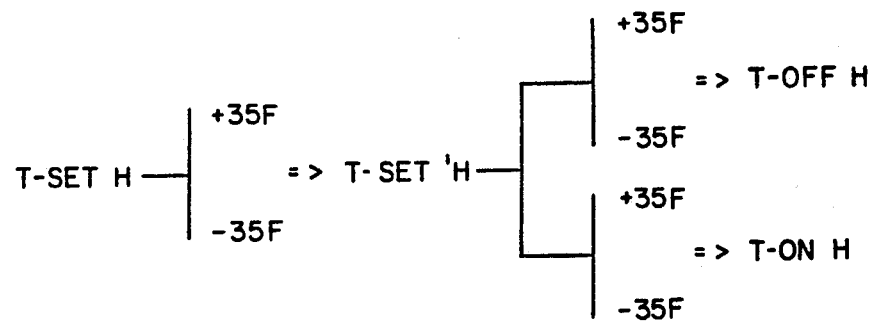
Figure 8:
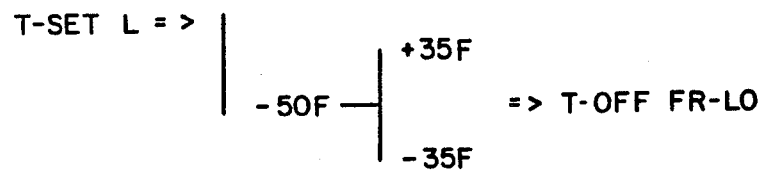
FIG. 8 is a bar graph that illustrates the bake mode first temperature rise compensation action points of the control unit of FIG. 1.
Figure 8:
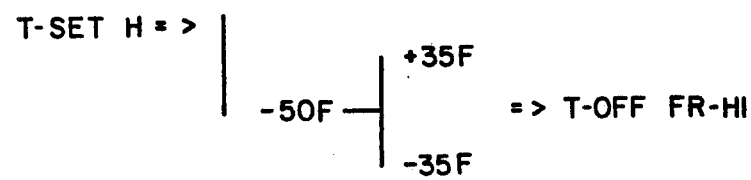

When the bake mode starts, the EEPROM U3 is read and offsets apply to a T-set to form T-set' which is compensation for center of oven to the sensor position. Optimally, the center cavity temperature is to be controlled to the T-set. The sensor is usually mounted off to a corner which causes gradients. Since these gradients are different between lower temperatures and higher ones, a T-set'H and T-set'L offset is used (FIG. 7).

Actual control of the heating element relays is done by comparing the A to D output temperature (T-act) inside the microcomputer U2 to T-on and T-off temperatures. These are formed by offsetting T-set' with separate EEPROM offset values for upper or lower band (FIG. 7). Relay energizes when T-act is less than T-on, deenergizes when T-act is greater than T-off. If T-on and T-off are spread, there will be hysterisis to prevent rapid relay switching which shortens its life as well as obtaining a predictable temperature envelope.

2. Bake mode parameters—Relay duty cycling.

Further precise control of temperature swing can be obtained by time duty cycling the heating element relays when calling for heat. The relay can be cycled in percentages controllable by varying on and off times in 1 second steps. These on/off times are stored in the EEPROM U3 and are formatted such that with an EEPROM fault or no EEPROM, on time is 100%.

3. Bake mode parameters—quarter top heat QTH)

In many oven applications, more even and quicker heating can be obtained by implementing the broil (top) element as well as the bake (lower) element. In electromechanical oven systems, this is often done by applying quarter power to the broil element by applying 120 volts across a normally 240 volt operated element through a relay/mode switch arrangement. In the control unit 20, QTH is implemented by time duty cycling 240 volts to the broil element 25% (usually 15 sec on/45 sec off). Choosing QTH option as well as broadening the range for any percentage is implemented with stored values in the EEPROM U3.

4. Broil mode parameters

Similar to bake, broil elements can be thermostatically controlled and time duty cycled separately. Relative multi-step user selectable broil settings can be implemented such as "LO-HI".

Typically, broil is executed with the oven door open which prevents a T-off from ever being reached. To reduce the power applied, therefore, the element on-time percentage is reduced for lower settings. T-off and T-on temperatures are also used in case the door is closed and are not typically user selectable. (FIG. 6)

This multi-step format is suited for electric ovens. For gas applications, time duty cycling does not lend itself due to unpredictable ignition times, therefore only one broil setting is desirable.

5. Time of day clock retention

A typical oven control includes a time-of-day clock user feature. A mechanical clock freezes at its setting when power is removed. Electronic clocks loose the setting and return to a consistent preset time. Mechanical clocks have the advantage to the user in cases of short power losses where negligible amounts of time are lost.

The electronic clock can realize this advantage if the time digits are stored in the EEPROM U3 at the first sign of power loss. Upon power restoration, the stored digits are read, displayed and used. In this way, the mechanical system performance is duplicated and surpassed because the digits can flash at power up to indicate time was lost.

Power loss is detected by sensing the loss of an incoming 60 Hz power line signal. When line power is lost, enough DC power is stored in power supply capacitors to support the microcomputer U2 for several seconds while the present time digits are stored.

6. Control integrity

The EEPROM U3 can be used to support the overall quality of the control unit 20.

Support of redundancy/backup circuits described elsewhere is accomplished by storing values for hi temperature alarm thresholds. Standards require backup temperatures that give a shutdown and user apparent alarm when reached. These thresholds are stored in the EEPROM U3 and are changeable to track changeable T-set values for the various modes. (FIGS. 5 and 6).

At time of manufacture, the A to D circuity 30 is calibrated to offset component tolerances. An offset value is stored in the EEPROM U3 in lieu of a more typical potentiometer adjustment. The offset procedure includes limits of 35°.

Also at time of manufacture or field service, a check can be made of all important EEPROM values through a procedure known as checksum. All permanent EEPROM values are added together and the least significant two digits of the sum are displayed for test comparison. If no match is seen, it is assumed the EEPROM data is bad and must be reprogrammed or replaced. Statistically, this method catches a very high percentage of faults. Thus checksum value is typically stored in the EEPROM. At the beginning of each bake operation the checksum is recalculated and compared to the stored value. If they do not match, the EEPROM data is ignored and default values stored in the microcomputer ROM memory are substituted. This is similar to previously described operation without an EEPROM installed.

The control unit 20 algebraically sums several offsets (e.g. user preference offset, factory preference offset, FPO, Band Offsets) when calculating a Turn Off temperature. The Turn Off Temperature is the temperature at which the oven will turn off the elements when a Bake or Broil is active. From this calculated Turn Off temperature a Turn On Temperature is derived. This is figured using an EEPROM programmable offset to effectively create a Swing for the oven heating cycles.

The max setpoint limit algorithm uses a maximum temperature, the limit Temperature, which the Turn Off Temperature cannot exceed. This maximum temperature can either be EEPROM programmable or stored directly in ROM. The preference in design of the control unit 20 is to store this value directly in ROM.

If the Turn Off Temperature exceeds the limit Temperature, the limit temperature will be used as the Turn Off Temperature. This only applies to Bake and Broil functions. When the limit temperature is used a swing value may either be selected from ROM or EEPROM to finish the calculation of the Turn On Temperature.

This method effectively creates an upper temperature limit for Baking and Broiling operations. This prevents the possibility of all offsets adding up to an unsafe Turn Off Temperature. Along with the prevention of unsafe cooking temperatures it allows the oven to operate at a safe controlling temperature in the event a Turn Off Temperature exceeds the limit Temperature.

Therefore, this feature allows the calibration of the control system 25 to be increased for cooking bands but maintains a preselected maximum setpoint.

Thus, it can be seen that this invention provides a new control system and a new method of operating such a control system as well as a new method of making such a control system.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control system for an apparatus having a heating means and comprising a high energy control circuit means for operating said heating means and having an output relay driver transistor, manually operated means for initiating the operation of said high energy control circuit means, microcomputer means for operating the high energy control circuit means after said manually operated means has initiated the operation thereof, and supervisory circuit means for detecting dynamic failure of said microcomputer means and disabling said high energy control circuit means if said microcomputer means is not operating in a normal mode thereof, said supervisory circuit means having means requiring the manual operation of said manually operated means before permitting power to reach said high energy control circuit means whereby said high energy control circuit means is disabled unless said manual operation of said manually operated means has taken place and said microcomputer means is operating in said normal mode thereof, said supervisory circuit means having a supervisory transistor therein that is in series with said relay driver transistor and that must be switched on to enable said relay driver transistor, said supervisory circuit means having a capacitor therein for sustaining the on condition of said supervisory transistor, said manually operated means comprising momentary means for initially charging said capacitor and switching on said supervisory transistor when said manually operated means has been manually and momentarily operated to initiate the operation of said high energy control circuit means, said microcomputer means having means for continuing the charging of said capacitor only after the initial manual and momentary operation of said manually operated means has initially charged said capacitor and if said microcomputer means is operating in a normal mode thereof, the improvement comprising temperature sensing means that is operatively interconnected to said capacitor independently of said microcomputer means and has means that by-passes said microcomputer means and permits the continuous charging of said capacitor only as long as said temperature sensing means is sensing an output temperature effect of said heating means that is below a predetermined high temperature limit for said system and that terminates the charging of said capacitor when said sensed temperature is above said predetermined high temperature limit.

2. A control system as set forth in claim 1 wherein said means for continuing the charging of said capacitor comprises AC coupling means.

3. A control system as set forth in claim 2 wherein said means for initially charging said capacitor comprises a transistor that is temporarily switched on by the manual and momentary operation of said manually operated means.

4. A control system as set forth in claim 1 wherein said high energy control circuit has another output relay driver transistor that is also in series with said supervisory transistor and in parallel with the first-mentioned output relay driver transistor.

5. A control system as set forth in claim 4 wherein said manually operated means comprises a plurality of electrical switch means respectively operatively associated with said output relay driver transistors through said microcomputer.

6. A control system as set forth in claim 5 and comprising a relay means that has a coil means that will provide a double link break when deenergized, said supervisory transistor being in series with said coil means and energizing said coil means when said supervisory transistor is in an on condition thereof.

7. A control system as set forth in claim 6 and comprising two other relay means that respectively have coil means that are adapted to activate heating element means of said heating means when energized, said relay driver transistors respectively being adapted to energize said coil means of said other relay means.

8. A control system as set forth in claim 1 wherein said control system is adapted to be a cooking apparatus control system and said output relay driver transistor is adapted to operate a heating element means of said heating means that is adapted to heat the oven of such cooking apparatus.

9. In a method of making a control system for an apparatus having a heating means and comprising a high energy control circuit means for operating said heating means and having an output relay driver transistor, manually operated means for initiating the operation of said high energy control circuit means, microcomputer means for operating the high energy control circuit means after said manually operated means has initiated the operation thereof, and supervisory circuit means for detecting dynamic failure of said microcomputer means and disabling said high energy control circuit means if said microcomputer means is not operating in a normal mode thereof, said supervisory circuit means having means requiring the manual operation of said manually operated means before permitting power to reach said high energy control circuit means whereby said high energy control circuit means is disabled unless said manual operation of said manually operated means has taken place and said microcomputer means is operating in said normal mode thereof, said supervisory circuit means having a supervisory transistor therein that is in series with said relay driver transistor and that must be switched on to enable said relay driver transistor, said supervisory circuit means having a capacitor therein for sustaining the on condition of said supervisory transistor, said manually operated means comprising momentary means for initially charging said capacitor and switching on said supervisory transistor when said manually operated means has been manually and momentarily operated to initiate the operation of said high energy control circuit means, said microcomputer means having means for continuing the charging of said capacitor only after the initial manual and momentary operation of said manually operated means has initially charged said capacitor and if said microcomputer means is operating in a normal mode thereof, the improvement comprising the step of forming a temperature sensing means that is operatively interconnected to said capacitor independently of said microcomputer means and has means that by-passes said microcomputer means and permits the continuous charging of said capacitor only as long as said temperature sensing means is sensing an output temperature effect of said heating means that is below a predetermined high temperature limit for said system and that terminates the charging of said capacitor when said sensed temperature is above said predetermined high temperature limit.

10. In a method of operating a control system for an apparatus having a heating means and comprising a high energy control circuit means for operating said heating means and having an output relay driver transistor, manually operated means for initiating the operation of said high energy control circuit means, microcomputer means for operating the high energy control circuit means after said manually operated means has initiated the operation thereof, and supervisory circuit means for detecting dynamic failure of said microcomputer means and disabling said high energy control circuit means if said microcomputer means is not operating in a normal mode thereof, said supervisory circuit means having means requiring the manual operation of said manually operated means before permitting power to reach said high energy control circuit means whereby said high energy control circuit means is disabled unless said manual operation of said manually operated means has taken place and said microcomputer means is operating in said normal mode thereof, said supervisory circuit means having a supervisory transistor and that must be switched on to enable said relay driver transistor, said supervisory circuit means having a capacitor therein for sustaining the on condition of said supervisory transistor, said manually operated means comprising momentary means for initially charging said capacitor and switching on said supervisory transistor when said manually operated means has been manually and momentarily operated to initiate the operation of said high energy control circuit means, said microcomputer means having means for continuing the charging of said capacitor only after the initial manual and momentary operation of said manually operated means has initially charged said capacitor and if said microcomputer means is operating in a normal mode thereof, the improvement comprising the step of using means of a temperature sensing means that is operatively interconnected to said capacitor independently of said microcomputer means to by-pass said microcomputer means and permit the continuous charging of said capacitor only as long as said temperature sensing means is sensing an output temperature effect of said heating means that is below a predetermined high temperature limit for said system and to terminate the charging of said capacitor when said sensed temperature is above said predetermined high temperature limit.

* * * * *